July 3, 1934.   F. JUND   1,964,762
CLUTCH MECHANISM FOR USE WITH WINCHES
Filed Feb. 24, 1933   2 Sheets-Sheet 1

Inventor:
Frédéric Jund

Inventor:
Frédéric Jund

Patented July 3, 1934

1,964,762

UNITED STATES PATENT OFFICE 1,964,762

CLUTCH MECHANISM FOR USE WITH WINCHES

Frédéric Jund, St.-Pierre, France, assignor to Les Ateliers De St. Pierre, St.-Pierre, France, a limited company of France Application February 24, 1933, Serial No. 658,326
In France July 22, 1932

2 Claims. (Cl. 192—35)

My invention relates to a clutch mechanism for use with winches, especially winches for buildings, in which a clutching device effects coupling between the driving part and the driven part said clutching device being controlled by an axially moved auxiliary coupling arranged between both parts.

Couplings of this kind are already in use. The severe working conditions to which they are submitted cause a speedy wear of all their control means. In the known constructions, this fact renders frequent regulating operations of the control means necessary according to the wear. On the other hand said constructions, especially if they have large dimensions, require strong amplification of the handling effort in order to overcome the axial pressure of the coupling parts. They are of great length, their friction surfaces are exposed to dust and they are entirely dependent on the conscientiousness of the operators.

All these drawbacks are avoided in my clutching mechanism, in which a cam with two symmetrical projections is arranged on the hub of the auxiliary coupling, a crossbar for instance, while inside a flange of the winch drum two clamping levers, positively connected to one another are lying free and are controlled by said projections. The clamping levers in their turn cooperate with a clutch ring disposed inside the flange and able to be pressed by the levers against the flange wall, said ring being positively turned round by the driving wheel. The auxiliary coupling is movable in axial direction in order to make it bear against a friction surface on the frontal face of the winch drum, when an actuating lever mounted on the main shaft of the winch and provided with cams is swung out by means of a hand lever and a knee joint inserted between both levers.

A clutching mechanism thus arranged can work independently of the wear of its different parts and without requiring any regulation. It is not submitted to a direct influence by the operators. All its important and moving parts are well protected inside a flange and therefore not exposed to dust. Finally it can work in both senses of rotation.

These improvements are described in detail in the specification which follows in relation to the annexed drawings, in which.

Figure 1:
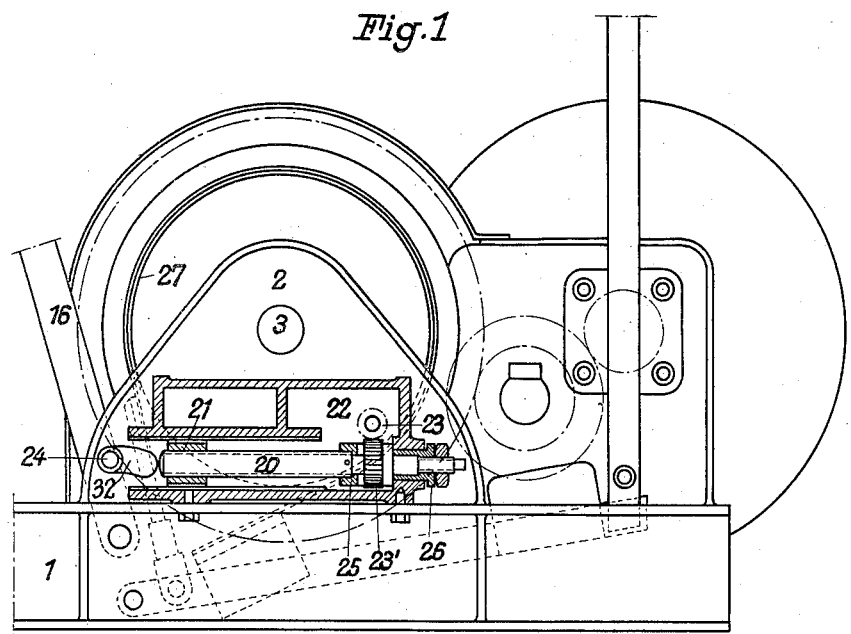
Fig. 1 is a front view in part section of the winch.
Figure 2:
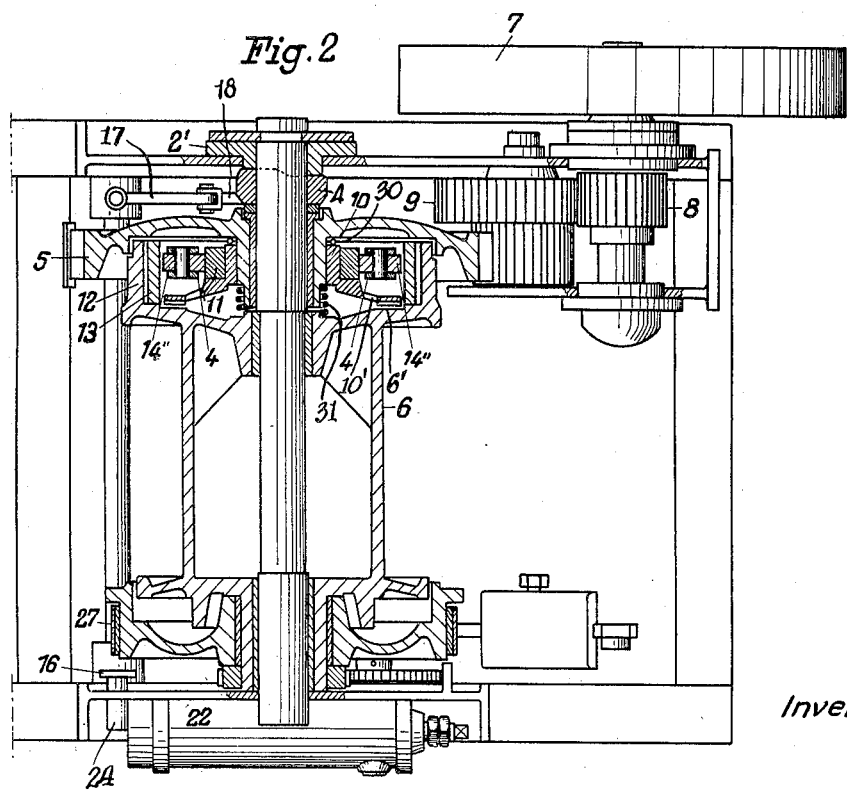
Fig. 2 is a horizontal section along the axis of the winch drum.
Figure 3:
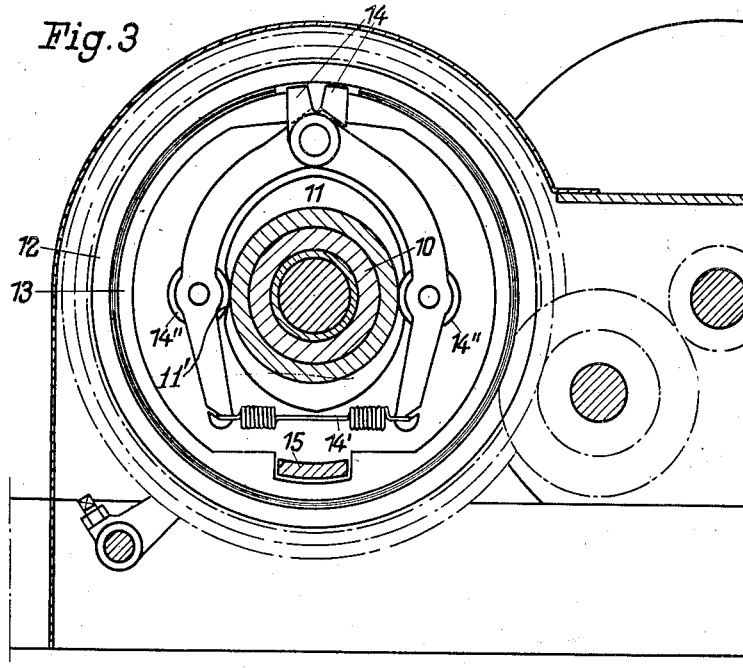
Fig. 3 is a vertical section taken to the right of the coupling mechanism.

On the supporting frame (beam) 1 is fitted in bearings 2, 2' the main shaft 3 which carries loose upon it an eccentric clutch lever 4, the engaging wheel 5 and the cable drum 6. The wheel 5 is controlled by a pulley 7 and a train of reducing gears 8 and 9. On its hub a cross-bar 10 turns in a loose manner, the hub of the said cross-bar carrying a cam 11 with two symmetrical projections having rounded notches 11' at their bases. The arms 10' of the cross-bar 10, which are lined with frictional material, can bear against an annular frictional plane 6' provided on the front of the drum 6. The latter is, moreover, widened out at this point to form a circular flange 12 which envelops the cross-bar 10, an open clutch ring 13 capable of bearing against its inside walls, and a gripping mechanism comprising clamps 14, whereby this action is set up. For this purpose, the short arms of the clamps engage between the ends of the ring 13 and the long arms come under the action of a spring 14' to bear against the symmetrical projections of the cam 11, this action taking place through the medium of friction rollers 14'' with which they are furnished, and which are normally held back in the rounded notches 11'. Finally, the wheel 5 is provided with an engaging lug 15 which is positioned in a groove provided for the purpose in the ring 13.

The gripping mechanism 14 is entirely free inside the flange, which enables it to adapt itself with facility to the small inevitable irregularities in manufacture, and to distribute always, according to exigencies, the elongation strains made upon the ring.

Between the wheel 5 and the cross-bar 10 is inserted a ball race 30, and between the wheel 5 and the drum 6 there is a compression spring 31. The lever 4, is lined on its face turned towards the bearing 2' with cams 4' in the form of saw-teeth, which engage in hollows of the same shape in the bearing 2', thus setting up, when the lever is swung, an axial displacement of the wheel, and consequently of the frictional cross-bar 10, which then comes to bear against the drum 6, and to a certain extent becomes one piece with the said drum. When the cross-bar 10 is not in contact with the drum 6 and the wheel 5 is turning, the latter takes with it the ring 13, the clamps 14 and the cross-bar 10. When, on the other hand, the cross-bar is pressed against the drum, the working resistance which is brought on the latter exercises a braking effect on the cross-bar 10, the rotation of which is thus retarded, and this to a greater extent as the resistance to be overcome itself becomes greater. From this results the displacement of the friction rollers 14" of the clamps 14 on the symmetrical projections of the cam 11, the opening of the clamps 14, the separation of the ends of the ring 13, and the pressure of the periphery of the said ring against the inside walls of the flange 12, that is to say, the wheel 5 and the drum 6 are clutched together.

Thanks to the arrangement here described, the coupling of the drum 6 to the wheel 5 only requires a slight axial strain produced by the swinging of the lever 4, and the extent of the temporary joint functioning of the two members hereinbefore mentioned is automatically regulated in direct relation to the extent of the resistance to be overcome.

Figure 4:
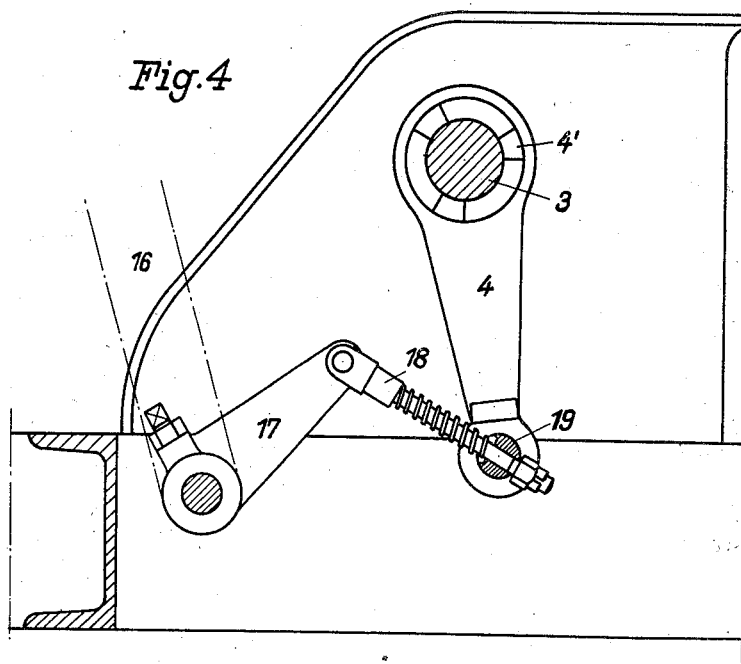
Fig. 4 shows the manipulating lever in detail.

Figures 1 and 4 show the control device for the lever 4. The manipulating lever proper 16 is pivoted in the supporting frame 1 and acts on the lever 4 through the medium of a knee joint 17, 18, which is folded in the non-working position and straightens out in the working position. The part 18 of the knee joint is a spring push-rod which slides in a slide-block 19 of the lever 4, while the part 17 is a fixed arm on the pivoting axle of the lever 16. A finger 24 on the lever 16 which passes through a slot 32 in the bearing wall limits the course of the lever in both directions. Thanks to this arrangement, the lever 4 is totally independent of the influence of persons in charge of the manipulation of the winch, in view of the fact that the swinging of the lever 16 first causes the compression of the spring of the push-rod 18 and then gives way to an oscillation of the lever 4. This results in a saving of the winch and a reduction in the wear and tear to which it is subject.

The throwing out of gear can, moreover, also be effected automatically at a given point in the course of the winch. For this purpose a special disengaging device is provided in one of the two cheeks of the supporting frame, which device is composed essentially of a conveyor screw 20 and a slide-block 21 lodged in a box 22, the screw which projects from one side of the box being rotated through the medium of a train of gears 23, and the slide-block can come to rest at the end of its course against a finger 24 adapted to the manipulating lever 16. The course of the slide-block 21 is adjustable. For this purpose, the control wheel 23' of the screw is fitted loose on the said screw and engages the screw by friction against the washer 25, which is in one piece with it, and which is pressed against the wheel by a nut 26 fitted on the threaded end of the screw provided with a square terminal. When the nut is tightened as far as it will go, the washer 25 and the wheel 23' make only one whole, and the control effort which is brought to bear on the wheel is transmitted simultaneously to the screw 20. For adjusting the course the nut 26 is unscrewed. At the moment when the friction between the washer 25 and the wheel 23' ceases, it will be possible to turn the screw 20 with an appropriate tool applied to its square terminal. This results in a displacement of the slide-block in its guides, and consequently a modification of the distance which it will cover before it comes into contact with the finger 24. After the adjustment the nut 26 is again screwed up.

Finally, the winch is equipped on the drum 6 with an automatic band brake 27 which enables the drum to be braked at will according to requirements.

I claim:

1. In a clutching mechanism for use with winches, especially winches for buildings, a driving wheel rotatably mounted and axially movable on the main shaft of the winch, a winch drum to be driven, a widened flange on the winch drum entering by its circumferential wall the disc of the driving wheel, a cross-bar auxiliary coupling member freely turning on the hub of the driving wheel inside the flange, an annular friction surface on the frontal face of the winch drum for engaging with the arms of the cross-bar, a cam with two symmetrical projections on the hub of the cross-bar, rounded notches at the bases of the symmetrical projections, spring urged clamping levers lying freely inside the flange, rollers on the levers in contact with the cam projections, a split clutch ring lying freely inside the flange and able to be opened by the short arms of the clamping levers, means on the driving wheel for positively driving the clutch ring and means on the winch shaft for axially moving the driving wheel and the cross-bar.

2. In a clutching mechanism for use with winches especially winches for buildings, a driving wheel rotatably mounted and axially moving on the main shaft of the winch, a winch drum to be driven a widened flange on the winch drum entering by its circumferential wall the disc of the driving wheel, a cross-bar auxiliary coupling member freely turning on the hub of the driving wheel inside the flange, an annular friction surface on the frontal face of the winch drum for engaging with the arms of the cross-bar, a ball race between the driving wheel and the cross-bar, a spring between the wheel hub and the frontal face of the winch drum, a cam with two symmetrical projections on the hub of the cross-bar, spring urged clamping levers lying freely inside the flange and actuated by the cam projections, a split clutch ring lying freely inside the flange and actuated by the clamping levers, means on the driving wheel for positively driving the clutch ring, a rotative lever on the main shaft of the winch for axially displacing the driving wheel and the cross-bar, a non-rotative ring adjacent to the rotative lever, a hand lever for actuating the rotative lever and a knee joint transmitting system between both levers.

FRÉDÉRIC JUND.